United States Patent
Hanson, Jr. et al.

(10) Patent No.: US 8,324,336 B2
(45) Date of Patent: Dec. 4, 2012

(54) COMPOSITIONS USEFUL IN GOLF BALLS

(75) Inventors: Wallace Lee Hanson, Jr., Duluth, GA (US); Kevin W. Light, Acworth, GA (US); Ray Vernon Scott, Jr., Blacksburg, VA (US); Shenshen Wu, Shrewsbury, MA (US)

(73) Assignees: The Hanson Group, LLC, Duluth, GA (US); Foremost Golf Manufacturing, Ltd., Taipei (TW)

( * ) Notice: Subject to any disclaimer, the term of this patent is extended or adjusted under 35 U.S.C. 154(b) by 295 days.

(21) Appl. No.: 12/514,538

(22) PCT Filed: May 29, 2008

(86) PCT No.: PCT/US2008/065080
§ 371 (c)(1),
(2), (4) Date: Feb. 3, 2010

(87) PCT Pub. No.: WO2008/150865
PCT Pub. Date: Dec. 11, 2008

(65) Prior Publication Data
US 2010/0144467 A1    Jun. 10, 2010

Related U.S. Application Data

(60) Provisional application No. 60/940,546, filed on May 29, 2007.

(51) Int. Cl.
*C08G 18/10* (2006.01)
*C08G 18/32* (2006.01)
*C08G 18/48* (2006.01)
*A63B 37/12* (2006.01)

(52) U.S. Cl. .............. 528/64; 528/60; 528/61; 473/378

(58) Field of Classification Search .................... None
See application file for complete search history.

(56) References Cited

U.S. PATENT DOCUMENTS

| | | | |
|---|---|---|---|
| 3,147,324 A | 9/1964 | Ward | |
| 3,264,272 A | 8/1966 | Rees | |
| 3,454,280 A | 7/1969 | Harrison et al. | |
| 3,819,768 A | 6/1974 | Molitor et al. | |
| 3,979,547 A * | 9/1976 | Roberts et al. | 152/525 |
| 3,989,568 A * | 11/1976 | Isaac | 156/182 |
| 4,123,061 A | 10/1978 | Dusbiber | |
| 4,130,542 A | 12/1978 | Chang et al. | |
| 4,323,247 A | 4/1982 | Keches et al. | |
| 4,526,375 A | 7/1985 | Nakade | |
| 4,884,814 A | 12/1989 | Sullivan | |
| 4,911,451 A | 3/1990 | Sullivan et al. | |
| 4,927,901 A * | 5/1990 | Miyazaki | 528/64 |
| 5,334,673 A | 8/1994 | Wu | |
| 5,484,870 A | 1/1996 | Wu | |
| 5,692,974 A | 12/1997 | Wu et al. | |
| 5,733,428 A | 3/1998 | Calabria et al. | |
| 5,908,358 A | 6/1999 | Wu | |
| 6,518,358 B1 | 2/2003 | Wu | |
| 6,582,326 B2 | 6/2003 | Wu et al. | |
| 6,610,812 B1 | 8/2003 | Wu et al. | |
| 6,719,646 B2 | 4/2004 | Calabria | |
| 6,793,864 B1 | 9/2004 | Dewanjee et al. | |
| 6,903,178 B2 | 6/2005 | Wu et al. | |
| 6,949,595 B2 | 9/2005 | Morgan et al. | |
| 6,987,159 B2 | 1/2006 | Iwami | |
| 7,098,274 B2 | 8/2006 | Wu et al. | |
| 7,148,278 B2 | 12/2006 | Bulpett et al. | |
| 2003/0228937 A1 * | 12/2003 | Dewanjee | 473/374 |
| 2005/0187336 A1 * | 8/2005 | Yokota | 524/497 |

FOREIGN PATENT DOCUMENTS

JP   10095826   *   4/1998

OTHER PUBLICATIONS

TRI-ISO Specialty Chemicals Newsletter Mar. 2007 p. 1-3.*
Chou, P.C., et al., 'Contact forces, coefficient of restitution, and spin rate of golf ball impact', Science and Golf II, E & FN Spon' (1994).
Cochoran, A.J., 'Development and use of one-dimensional models of a golf ball', Science and Golf III, Routledge, Aug. 2002.
Lemons, L.D., 'Experiments in golf ball-barrier impacts', Science and Golf III, Routledge (1998).
Primeaux, D.J.II, 'Polyurea Elastomer Technology: History, Chemistry & Basic Formulating Techniques', A Presentation by Primeaux Associates LLC, Elgin, Texas, www.polyurea@flash.net, (2004), pp. 1-20.
Quintavalla, S.J., 'Extension of the bergstrom-boyce model to high strain rates', Rubber Chem. and Tech., 77(5), (2004).
Scott, R., and Hanson, L., 'Higher Performance Raw Materials for Improved Polyurea Properties', PDA Conference Biloxi, MS, The Hanson Group LLC (Mar. 2005), 37 pages.
Tavares, G.,et al., 'Use of finite element analysis in design of multilayer golf balls', Science and Golf III, Human Kinetics, (1998).
United States Golf Association and R&A Rules Limited (USGA), 'Actual Launch Conditions Overall Distance and Symmetry Test Procedure' (Phase II) Revision 1 (Jun. 1, 2004) 7 pages. United States Golf Association (USGA) and R&A Rules Limited, 'Weight and Size Test Procedures' (Dec. 1999) 6 pages.
United States Golf Association and R&A Rules Limited (USGA), 'Initial Velocity Test Procedure', (Dec. 1999) 13 pages.
Wu, S., 'Operation and Applications of Vibrating Needle Curemeter', Presented at a Meeting of the Polyurethane Manufacturers Association at The Copley Plaza, Boston, Massachusetts (Oct. 27, 1992), pp. 2-16.

* cited by examiner

*Primary Examiner* — David Buttner
(74) *Attorney, Agent, or Firm* — Kilpatrick Townsend & Stockton LLP

(57) ABSTRACT

Curable polyurethane, polyurea and polyurethane/polyurea compositions that are particularly useful as the outer layer and/or at least one inner layer of golf balls, cured compositions, golf balls comprising the cured composition, and methods of increasing the initial velocity of a golf ball using the curable polyurethane, polyurea and polyurethane/polyurea compositions are disclosed.

5 Claims, No Drawings

COMPOSITIONS USEFUL IN GOLF BALLS

CROSS-REFERENCE TO RELATED APPLICATIONS

This application is the National Stage of International Application No. PCT/US2008/065080, filed May 29, 2008, which claims the benefit of U.S. Provisional Application No. 60/940,546 filed May 29, 2007, the disclosure of which is incorporated herein by reference in its entirety.

FIELD OF THE INVENTION

The invention relates generally to curable polyurethane, polyurea and polyurethane/polyurea hybrid compositions that are particularly useful as the outer layer and/or at least one inner layer of golf balls, to the cured compositions, to golf balls comprising the cured composition, and to methods of increasing the initial velocity of a golf ball using the curable polyurethane, polyurea and polyurethane/polyurea hybrid compositions.

BACKGROUND OF THE INVENTION

Golf ball compositions are formed from a variety of materials, including balata and ionomer resins. Balata is a natural or synthetic trans-polyisoprene rubber. Balata covered balls are favored by the more highly skilled golfers because the softness of the cover allows the player to achieve higher spin rates sufficient to more precisely control ball direction and distance, particularly on shorter shots.

However, balata covered balls are easily damaged, and thus lack the durability required by the average golfer. Accordingly, alternative cover compositions have been developed in an attempt to provide balls with spin rates and a feel approaching those of balata covered balls, while also providing a golf ball with a higher durability and overall distance.

Ionomer resins have, to a large extent, replaced balata as a cover stock material. Chemically, ionomer resins are a copolymer of an olefin and an alpha, beta ethylenically-unsaturated carboxylic acid having 10-90% of the carboxylic acid groups neutralized by a metal ion. See U.S. Pat. No. 3,264,272. Commercially available ionomer resins include, for example, copolymers of ethylene and methacrylic or acrylic acid neutralized with metal salts. These are sold by E.I. DuPont de Nemours and Co. under the trademark "SURLYN®" and by the Exxon Corporation under the trademark "ESCOR®" and the trademark "IOTEK®." These ionomer resins are distinguished by the type of metal ion, the amount of acid, and the degree of neutralization.

U.S. Pat. No. 3,454,280, U.S. Pat. No. 3,819,768, U.S. Pat. No. 4,323,247, U.S. Pat. No. 4,526,375, U.S. Pat. No. 4,884,814, and U.S. Pat. No. 4,911,451 all relate to the use of SURLYN®-type compositions in golf ball covers. However, while SURLYN® covered golf balls as described in the preceding patents possess virtually cutproof covers, they have inferior spin and feel properties as compared to balata covered balls.

Polyurethanes and polyureas have also been recognized as useful materials for golf ball covers since as early as about 1960. For example, U.S. Pat. No. 3,147,324 is directed to a method of making a golf ball having a polyurethane cover, which is durable while maintaining the "feel" of a balata ball. The polyurethane covers can be formed from polyurethane prepolymers cured with curing agents having at least one active hydrogen groups (such as amines and/or polyols), wherein the prepolymers are formed from the reaction of polyols with polyisocyanates.

There are other examples of the use of polyurethane and polyurea as golf ball cover materials. For example, U.S. Pat. No. 4,123,061 discloses that a golf ball can be made from a polyurethane prepolymer of polyether and a curing agent, such as a trifunctional polyol, a tetrafunctional polyol, or a diamine. U.S. Pat. No. 5,334,673 discloses the use of thermoset and thermoplastic polyurethanes for forming golf ball covers, and in particular, thermoset polyurethane covered golf balls made from a composition of polyurethane prepolymer and a slow-reacting amine curing agent and/or a difunctional glycol. U.S. Pat. No. 5,484,870 discloses that golf ball covers may be prepared from polyurea compositions that are prepared by combining an organic isocyanate having at least two isocyanate functional groups with an organic amine curing agent.

Polyurethane is a product of a reaction between a polyurethane prepolymer and a polyol curing agent. The polyurethane prepolymer is a product formed by a reaction between a polyol and a diisocyanate. The curing agent is either a polyamine or a polyol. It has been discovered that a polyurethane prepolymer cured with a slow-reacting curing agent selected from the group of slow reacting polyamine curing agents or polyfunctional glycols produces a golf ball cover that has good durability and performance. These golf balls have been found to have improved shear resistance and cut resistance compared to golf balls having covers made from either balata or soft SURLYN® material.

The first commercially successful polyurethane covered golf ball was Titleist's PROFESSIONAL™ golf ball in 1993. The principal reason for the delay in bringing polyurethane composition golf ball covers on the market was that it was a daunting engineering task to apply a covering of polyurethane composition to a golf ball core to form a golf ball cover having a uniform thickness. Further progress has been made in the area of polyurethane balls, including improved water resistance, UV light stability, abrasion resistance and durability.

There has been further progress in the uses of polyurethane and polyurea, including the use of polyurea/polyurethane hybrids. According to the Polyurea Development Association, a polyurea is defined as the result of a chemical reaction between an isocyanate and an amine. Polyurethane is defined as the result of a chemical reaction between an isocyanate and a polyol. Polyurea/polyurethane hybrid formulations are defined as the result of a chemical reaction between an isocyanate and a mixture of polyol and polyamine reactants. These formulations generally provide an "intermediate" polyurea that displays many of the same properties of a polyurea. The isocyanate can be aromatic or aliphatic in nature and can be monomer, polymer, or any variant reaction of isocyanates, quasi-prepolymer or a prepolymer. The prepolymer or quasi-prepolymer can be made of an amine-terminated polymer resin or a hydroxyl-terminated polymer resin.

Further improvements to golf ball performance is desired in such characteristics as initial velocity of the golf ball. Initial velocity is related to the coefficient of restitution of a golf ball. The interaction between the club head and the golf ball determines the distance and direction the golf ball will travel. The relationship between the speed of the club head and the initial velocity of the golf ball depends on the coefficient of restitution of the golf ball, which varies between different types of balls. The distance that the golf ball travels is dependent on the speed of the club head and the initial velocity of the golf ball, which varies between different types of balls. When the golf ball is struck by the club, it is deformed and flattened by the force of impact. A golf ball with a harder core will deform less than a softer golf ball. In general, a harder ball will travel further than a softer ball because it deforms less and will efficiently transfer more energy from club to ball. During the impact between the golf ball and club head, kinetic energy is transferred and stored as the ball tries to regain its original shape. To obtain maximum distance in the drive, a golf ball must be selected that maximizes restitution for the club speed. Further details may be found at: ffden-2.phys.uaf.edu/211_fall2002.web.dir/josh_fritts/index.html.

Despite these efforts, there is still a need for golf balls with an improved initial velocity without negatively impacting the other desirable properties of golf balls. The present invention is directed to these, as well as other, important needs.

SUMMARY OF THE INVENTION

The invention is generally directed to curable polyurethane, polyurea and polyurethane/polyurea hybrid compositions that are particularly useful as the outer layer and/or at least one inner layer of golf balls, to the cured compositions, to golf balls comprising the cured composition, and to methods of increasing the initial velocity of a golf ball using the curable polyurethane, polyurea and polyurethane/polyurea hybrid compositions.

In one embodiment, the invention is directed to compositions, comprising:
a. a prepolymer comprising the reaction product of:
  i. a polyisocyanate; and
  ii. a component selected from the group comprising a first polyol, a first polyamine having a molecular weight of greater than about 900 g/mol or a combination thereof;
b. a first curing agent which is an optionally substituted 4,4'-methylenebisaniline; and
c. at least one second curing agent;
wherein said second curing agent has a cure rate that is slower than the cure rate of said first curing agent.

In one embodiment, the invention is directed to compositions, comprising:
a. a polyurethane prepolymer comprising the reaction product of:
  i. toluene diisocyanate; and
  ii polytetramethylene ether glycol.
b. 4,4'-methylenebis(2-ethylaniline); and
c. at least one second curing agent selected from the group consisting of dimethylthio-2,4-toluenediamine; dimethylthio-2,6-toluenediamine; polycaprolactone triol; polytetramethyleneoxide-di-p-aminobenzoate; polyetheramine; dimer diol; and mixtures thereof.

In other embodiments, the invention is directed to the cured compositions described above, wherein the composition comprises forming at least one layer in a golf ball. In certain preferred embodiments, comprising the cured compositions described herein, the layer forms the outer covering of the golf ball.

In yet other embodiments, the invention is directed to golf balls, comprising:
a. a core; and
b. at least one cured layer described above, either as an outer layer, at least one inner layer, or both.

In further embodiments, the invention is directed to methods of increasing the initial velocity of a golf ball, comprising the steps of:
  preparing the composition described;
  providing a core; and
  forming at least one cured layer on said core from said composition.

DETAILED DESCRIPTION OF THE INVENTION

The present invention relates generally to curable polyurethane, polyurea and polyurethane/polyurea hybrid compositions that are particularly useful as the outer layer and/or at least one inner layer of golf balls, to the cured composition, to golf balls comprising the cured composition, and to methods of increasing the initial velocity of a golf ball using the curable polyurethane, polyurea and polyurethane/polyurea hybrid compositions. The novel polyurethane, polyurea and polyurethane/polyurea hybrid polymer provide many beneficial properties, many of which overcome shortcomings of the prior art.

As used herein, the term "polyurea" refers to a polymer that is the result of a chemical reaction between an isocyanate and an amine.

As used herein, the term "polyurethane" refers to a polymer that is the result of a chemical reaction between an isocyanate and a polyol.

As used herein, the phrase "polyurea/polyurethane hybrid formulation" refers to a polymeric mixture that is the result of a chemical reaction between an isocyanate and a mixture of polyol and amine reactants.

As used herein, the term "polymer" refers to, but is not limited to, oligomers, adducts, homopolymers, random copolymers, pseudo-copolymers, statistical copolymers, alternating copolymers, periodic copolymer, block copolymers, bipolymers, terpolymers, quaterpolymers, other forms of copolymers, substituted derivatives thereof, and mixtures thereof. These polymers can be linear, branched, block, graft, monodisperse, polydisperse, regular, irregular, tactic, isotactic, syndiotactic, stereoregular, atactic, stereoblock, single-strand, double-strand, star, comb, dendritic, and/or ionomeric.

As used herein, the term "prepolymer" refers to a polymer of relatively low molecular weight, usually intermediate between that of the monomer and the final polymer or resin, which may be mixed with compounding additives, and which is capable of being hardened by further polymerization during or after a forming process.

As used herein, the term "polyol" refers to any aliphatic or aromatic compound containing at least two free hydroxyl groups. In practicing the processes disclosed herein, the selection of a suitable polyol is simply a matter of choice. For example, suitable polyols may have a backbone chain selected from the following classes: saturated or unsaturated, linear or branched or cyclic (including heterocyclic), aliphatic or aromatic (including mononuclear or polynuclear aromatics).

As used herein, the term "polyamine" refers to any aliphatic or aromatic compound containing at least two amine groups. In practicing the processes disclosed herein, the selection of a suitable amine is simply a matter of choice. For example, suitable polyamines may have a backbone chain selected from the following classes: saturated or unsaturated, linear or branched or cyclic (including heterocyclic), aliphatic or aromatic (including mononuclear or polynuclear aromatics).

As used herein, the term "optionally substituted 4,4'-methylenebisaniline" refers to any compound containing the 4,4'-methylenebisaniline moiety:

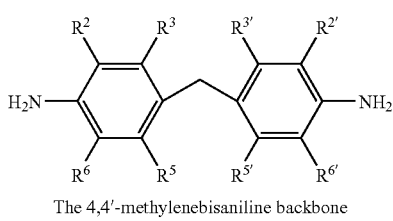

The 4,4'-methylenebisaniline backbone wherein each $R^2$, $R^3$, $R^5$, $R^6$, $R^{2'}$, $R^{3'}$, $R^{5'}$, $R^{6'}$ can be H, alkyl, alkenyl, alkynyl, cycloalkyl, aryl, heteroaryl, heterocycloalkyl, halogenated alkyl, halogenated alkenyl, halogenated alkynyl, halogenated cycloalkyl, halogenated heterocycloalkyl, alkoxy, sulfoxy, amino, monosubstituted amine, disubstituted amine, trisubstituted amine, hydroxy, nitro, F, Cl, Br, I, in any combination and further where any of the hydrogen groups on amino groups or methylene group may be substituted with another functional group that forms a stable compound. These substituents may be electron withdrawing or electron donating. These substituents may be linear, branched, cyclic, aliphatic or aromatic. The substituents may contain one or more heteroatoms or may contain no heteroatoms. Examples of optionally-substituted 4,4'-methylenebisanilines include 4,4'-methylenebis(2-ethylaniline); 4,4'-methylenebis(2-chloroaniline); 4,4'-methylene-bis(3-chloro-2,6-diethylaniline); 4,4'-methylenebis(2,6-diisopropylaniline); 4,4'-methylenebis(3-chloro-2,6-diisopropylaniline); 4,4'-methylenebis(2-isopropylaniline); 4,4'-methylenebis(2,6-diethylaniline); or a mixture thereof.

As used herein, the term "cure" as used in connection with a composition, e.g., "a curable material," "a cured composition," shall mean that any crosslinkable components of the composition are at least partially crosslinked. In certain examples of the present disclosure, the crosslink density of the crosslinkable components, i.e., the degree of crosslinking, can range from about 5% to about 100% of complete crosslinking. In other examples, the crosslink density can range from about 35% to about 85% of full crosslinking. In other examples, the crosslink density can range from about 50% to about 85% of full crosslinking. One skilled in the art will understand that the presence and degree of crosslinking, i.e., the crosslink density, can be determined by a variety of methods, such as dynamic mechanical thermal analysis (DMTA) in accordance with ASTM E1640-99.

As used herein, the term "cure rate" refers to the amount of time a particular mixture of prepolymer and curing agents take to react and form the final product.

As used herein, the term "slower reacting curing agent" refers to a curing agent that reacts slower under comparable conditions with respect to an optionally substituted 4,4'-methylenebisaniline. The term refers to a curing agent with nucleophilic groups that are sterically and/or electronically hindered because of the presence of electron withdrawing groups or interfering bulky groups situated adjacent to the reaction sites. A long chain flexible spacer of at least four carbons between reaction sites or three carbons with electron withdrawing groups also contributes to the slower reactivity of curing agents.

As used herein, the term "pot life" refers to the length of time a polymer mixture retains a viscosity low enough for it to be suitable for processing.

As used herein, the term "percent NCO" or "% NCO" refers to the percent by weight of free, reactive, and unreacted isocyanate functional groups in an isocyanate-functional molecule or material. The total formula weight of all the NCO groups in the molecule or material, divided by its total molecular weight, and multiplied by 100, equals the percent NCO.

As used herein, the term "initial velocity" refers to the US Golf Association standard. The standard reads, "The initial velocity is defined as the speed of the ball as it travels $2\pi$ feet after impact with the striker. The measurement is made by electronically timing the ball as it passes through a light source and ballistic screen separated by a fixed distance of about 6.283 feet. The light source is located approximately 8.75 inches from the point of impact.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/s to about 200 ft/s, and is usually understood to be 125 ft/s, unless otherwise specified. A golf ball may have different COR values at different initial velocities.

As used herein, the term "golf ball" includes but is not limited to the definitions and restrictions set by the U.S. Golf Association and The Royal and Ancient Golf Club of St. Andrews, which are incorporated herein by reference.

As used herein, the term "dispersant" refers to an additive that increases the stability of a suspension of powders or pigments in a liquid medium.

As used herein, the subscript letters such as m, n, x, y, and z used herein within the generic structures are understood by one of ordinary skill in the art as the degree of polymerization (i.e., the number of consecutively repeating units). In the case of molecularly uniformed products, these numbers are commonly integers, if not zero. In the case of molecularly non-uniformed products, these numbers are averaged numbers not limited to integers, if not zero, and are understood to be the average degree of polymerization.

Any numeric references to amounts, unless otherwise specified, are "by weight." As used herein, the term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The compositions of the present disclosure typically comprise a reaction product of a polyisocyanate and one or more reactants. In one example, the reaction product can be a polyurethane formed from a polyurethane prepolymer and a curing agent, the polyurethane prepolymer being a reaction product of a polyol and an isocyanate.

As used herein, the term "equivalent" is defined as the number of moles of a functional group in a given quantity of material, and calculated from material weight divided by equivalent weight, the later of which refers to molecular weight per functional group.

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than about 10, preferably less than about 5.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used herein, the term "compression," also known as "ATTI compression" or "PGA compression," refers to points derived from a Compression Tester (ATTI Engineering Company, Union City, N.J.), a scale well known in the art for determining relative compression of a spherical object. Compression is a property of a material as measured on a golf ball construction (i.e., on-ball property), not a property of the material per se.

As used herein, the term "dimer diol," refers to a diol species with 36 carbon atoms and a molecular weight of about 450 g/mol. Higher molecular weight dimerate polyester polyols (1700 to 3000 g/mol) that are used as polyols in prepolymer compositions are polymerized from the dimer diol.

As used herein, the term "light stabilizer," refers to any compound that absorbs, alters or reflects any wavelength of the electromagnetic spectrum, especially in the visible and ultra-violet ranges, such that the properties of a polymer composition are improved, preserved or remain unaltered.

Accordingly, in one embodiment, the invention is directed to compositions, comprising:
a. a prepolymer comprising the reaction product of:
  i. a polyisocyanate; and
  ii. a component selected from the group comprising a first polyol, a first polyamine having a molecular weight of greater than about 900 grams/mol or combination thereof;
b. a first curing agent which is an optionally substituted 4,4'-methylenebisaniline; and
c. at least one second curing agent;
wherein said second curing agent has a cure rate that is slower than the cure rate of said first curing agent.

In certain preferred embodiments of the compositions described herein, a polyurethane prepolymer is present in a ratio to the total weight of the first and second curing agents from about 0.8:1.0 to about 28:1, preferably in about 1:1 to about 10:1, more preferably, about 2:1 to about 8:1.

In certain preferred embodiments of the compositions described herein, the optionally substituted 4,4'-methylenebisaniline is present in an amount from about 5% by equivalent weight to about 95% by equivalent weight, preferably from about 10% by equivalent weight to about 90% by equivalent weight, more preferably from about 35% by equivalent weight to about 85% by equivalent weight, and even more preferably from about 40% to about 80%, based on the total equivalent weight of said first curing agent and said second curing agent.

In certain preferred embodiments of the compositions described herein, a second curing agent is present in an amount from about 5% by equivalent weight to about 95% by equivalent weight, preferably from about 10% by equivalent weight to about 90% by equivalent weight, more preferably from about 35% by equivalent weight to about 85% by equivalent weight, and even more preferably about 40% by equivalent weight to about 80% by equivalent weight, based on the total equivalent weight of said first curing agent and said second curing agent.

In certain preferred embodiments of the compositions described herein, the prepolymer is a polyurethane ionomer, polyurea ionomer, polyurethane, polyurea, polyurethane/polyurea hybrid, polyurethane/polyurea ionomer or a mixture thereof.

In certain preferred embodiments of the compositions described herein, the polyisocyanate is 1,6-hexamethylene-diisocyanate; 1-isocyanato-3,3,5-trimethyl-5-isocyanatomethyl cyclohexane; 3,3'-dimethyldiphenyl-4,4'-diisocyanate; 4,4'-dicyclohexylmethane diisocyanate; 4,4'-diphenylmethane diisocyanate; carbodiimide-modified diphenylmethane diisocyanate; cyclohexane-1,3-diisocyanate; cyclohexane-1,4-diisocyanate; cyclohexyl diisocyanate; dimer of 1,6-hexamethylene diisocyanate; dodecane-1,12-diisocyanate; isophorone diisocyanate; meta-tetramethylxylene diisocyanate; methyl cyclohexylene diisocyanate; naphthalene diisocyanate; para-phenylene diisocyanate; para-tetramethylxylene diisocyanate; polymeric 4,4'-diphenylmethane diisocyanate; tetramethylene-1,4-diisocyanate; toluene diisocyanate; triisocyanate of 2,2,4-trimethyl-1,6-hexane diisocyanate; triisocyanate of 2,4,4-trimethyl-1,6-hexane diisocyanate; trimer of 1,6-hexamethylene diisocyanate; trimethyl-hexamethylene diisocyanate, xylene diisocyanate; 2,4'-diphenylmethane diisocyanate; 2,2'-diphenylmethane diisocyanate; diphenylmethane diisocyanate; or a mixture thereof.

In certain preferred embodiments of the compositions described herein, the first polyol is 1,4-butanediol initiated polycaprolactone; 1,5-pentanediol initiated polycaprolactone; 1,6-hexanediol initiated polycaprolactone; acrylic polyol; C36 dimerate polyester polyol, diethylene glycol initiated polycaprolactone; hydroxy-terminated liquid isoprene rubber; neopentyl glycol initiated polycaprolactone; hydroxy-terminated polyesters of dimethylol proprionic acid; hydroxy-terminated polyesters of isophthalic sulfonic acid; ortho-phthalate-1,6-hexanediol polyester polyol; hydroxy-terminated polyesters of dimerized fatty acids, poly (ethylene oxide capped oxypropylene) glycol; poly(hexamethylene adipate) glycol; poly(hexamethylene carbonate) glycol; poly(oxypropylene) glycol; poly(phthalate carbonate) glycol; polybutadiene glycol; polybutylene adipate glycol; polycarbonate glycols containing bisphenol A; polyester polyol, polyethylene adipate glycol; polyethylene propylene adipate glycol; polyethylene terephthalate polyester polyol; polycaprolactone polyol; polytetramethylene ether glycol initiated polycaprolactone, polytetramethylene ether glycol; propylene glycol initiated polycaprolactone; trimethylol propane initiated polycaprolactone; or a mixture thereof.

In certain preferred embodiments of the compositions described herein, the first polyamine is polytetramethylene ether diamine; polyoxypropylene diamine; amine-terminated polycaprolactone; amine-terminated C36 dimerate polyesters; amine-terminated polyesters of dimerized fatty acid; amine-terminated polyesters of dimethylol proprionic acid; amine-terminated polyesters of isophthalic sulfonic acid; or a mixture thereof.

In certain preferred embodiments of the compositions described herein, the second curing agent is a second polyamine or a second polyol. In certain preferred embodiments of the compositions described herein, the second curing agent is 1,2-bis-(sec-butylamino)benzene; 1,3-[bis-(2-hydroxyethoxy)]-diethoxybenzene; 1,3-bis-(2-hydroxyethoxy)benzene; 1,3-bis-[2-(2-hydroxyethoxy)

ethoxy]benzene; 1,3-bis-{2-[2-(2-hydroxyethoxy)ethoxy]ethoxy}benzene; 1,4-bis-(sec-butylamino) benzene; 1,4-butanediol; 1,4-cyclohexyldimethylol; 2-methyl-1,4-butanediol; 3-methyl-1,4-butanediol; 2,3-butanediol; 2,3-dimethyl-2,3-butanediol; 2-methylpentamethylene-diamine; 2-propanol-1,1'-phenylaminobis; 3,5-diethyltoluene-2,4-diamine; 3,5-diethyltoluene-2,6-diamine; 3,5-dimethylthio-2,4-toluenediamine; 3,5-dimethylthio-2,6-toluenediamine; 4,4'-bis-(sec-butylamino)-diphenylmethane; 4,4'-dibutyl diamine diphenyl methane, 4,4'-methylenebis(2-chloroaniline); 4,4'-methylenebis(2-ethylaniline); 4,4'-methylenebis(2-isopropylaniline); 4,4'-methylene-bis-(3-chloro-2,6-diethylaniline); 4,4'-methylene-bis-(3-chloro-2,6-diisopropylaniline); 4,4'-methylenebis(2,6-diethylaniline); 4,4'-methylenebis(2,6-diisopropylaniline); an isomer or mixture of cyclohexyldimethylol; diethylamino propylamine; diethylene glycol; diisopropanolamine; dimer diol, dimethylamino propylamine; dimethylthio-2,4-toluenediamine; dimethylthio-2,6-toluenediamine; dipropylene glycol; ethylene glycol; hydroquinone-di(beta-hydroxyethyl) ether and its derivatives; imido-bis-propylamine; isomer or mixture of cyclohexane bis(methylamine); isomer or mixture of diaminocyclohexane; N,N'-dialkyldiamino diphenyl methane; polycaprolactone triol; polyetheramine; polyethylene glycol; polypropylene glycol; polytetramethylene ether glycol; polytetramethyleneoxide-di-p-aminobenzoate; propylene diamine; propylene glycol; resorcinol-di(beta-hydroxyethyl) ether and its derivatives; tetra-(2-hydroxypropyl)-ethylenediamine; tetrahydroxypropylene ethylene diamine; triethanolamine; triisopropanolamine; trimethyleneglycol-di-p-aminobenzoate; trimethylolpropane; diethyltoluenediamine; dimethylthiotoluenediamine; or a mixture thereof.

In certain preferred embodiments of the compositions described herein, the second curing agent is dimethylthio-2,4-toluenediamine, dimethylthio-2,6-toluenediamine, or a mixture thereof. In other preferred embodiments, the second curing agent is polytetramethyleneoxide-di(p-aminobenzoate). In yet other preferred embodiments, the second curing agent is polycaprolactone triol. In other preferred embodiments, the second curing agent is trimethyleneglycol-di-(p-aminobenzoate), a polyetheramine, or a mixture thereof. In certain preferred embodiments, the second curing agent is a polyetheramine.

In certain preferred embodiments of the compositions described herein, the optionally substituted 4,4'-methylenebisaniline is 4,4'-methylenebis(2-ethylaniline); 4,4'-methylenebis(2-chloroaniline); 4,4'-methylenebis(2,6-diethylaniline); 4,4'-methylenebis(3-chloro-2,6-diethylaniline); 4,4'-methylenebis(2,6-diisopropylaniline); 4,4'-methylenebis(2-isopropylaniline); 4,4'-methylenebis(3-chloro-2,6-diisopropylaniline); or a mixture thereof.

In certain preferred embodiments of the compositions described herein, the polyurethane prepolymer comprises the reaction product of toluene diisocyanate, polytetramethylene ether glycol, 4,4'-methylenebis(2-ethylaniline), and a second slower reactin curing agent.

In certain preferred embodiments of the compositions described herein, the composition further comprises at least one dispersant.

In certain preferred embodiments of the compositions described herein, the composition further comprises at least one coloring composition. In certain preferred embodiments, the coloring composition comprises a white pigment. In certain preferred embodiments, the white pigment is titanium dioxide, zinc oxide, or a mixture thereof. In certain preferred embodiments, the coloring composition further comprises polyoxypropylenediamine. In certain preferred embodiments, the coloring composition comprises a colorant.

In certain preferred embodiments of the compositions described herein, the composition further comprises at least one light stabilizer. In certain preferred embodiments of the compositions described herein, the light stabilizer is triazine, benzoxazinone, benzotriazole, benzophenone, benzoate, formamidine, cinnamate, propenoate, aromatic propanedione, benzimidazole, cycloaliphatic ketone, formanilide, oxamide, cyanoacrylate, benzopyranone, salicylate, succinate, sebacate, or a mixture thereof. Without wishing to be bound by any particular theory, it is believed that these compounds absorb harmful UV light and rapidly convert the light into harmless energy, such that the compounds reduce or prevent the rapid degradation of color in many conventional golf balls covers.

In another embodiment, the invention is directed to compositions, comprising:

a. a polyurethane prepolymer comprising the reaction product of:
   i. toluene diisocyanate; and
   ii. polytetramethylene ether glycol.
b. 4,4'-methylenebis(2-ethylaniline); and
c. at least one second curing agent selected from the group consisting of dimethylthio-2,4-toluenediamine; dimethylthio-2,6-toluenediamine; polycaprolactone triol; polytetramethyleneoxide-di-p-aminobenzoate; polyetheramine; dimer diol; and mixtures thereof.

In yet other embodiments, the invention is directed to a golf ball, comprising:

a. a core; and
b. at least one layer

In certain preferred embodiments, at least one layer of the golf ball comprises the composition of the invention. In other preferred embodiments, at least one layer comprising the composition of the invention forms the outer covering of the golf ball.

In other embodiments, the invention is directed to methods of increasing the initial velocity of a golf ball, comprising the steps of:

preparing the compositions described above;
providing a core; and
forming at least one cured layer on the core from the composition.

The present invention contemplates a polyurethane/polyurea polymeric composition used in the manufacture of a golf ball comprising the reaction product of at least one polyurethane prepolymer with an optionally substituted 4,4'-methylenebisaniline as a first curing agent and at least one slower second curing agent. The polyurethane prepolymer is formed from the reaction of at least one polyol with at least one polyisocyanate. A preferred embodiment of the polyurethane prepolymer synthesis step of this invention is the combination of polytetramethylene ether glycol with toluene diisocyanate. However, it can be contemplated that the polyurethane prepolymer synthesis step of this invention could employ a wide range of polyols and polyisocyanates.

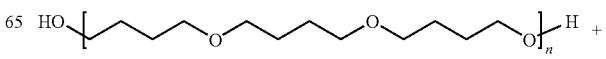

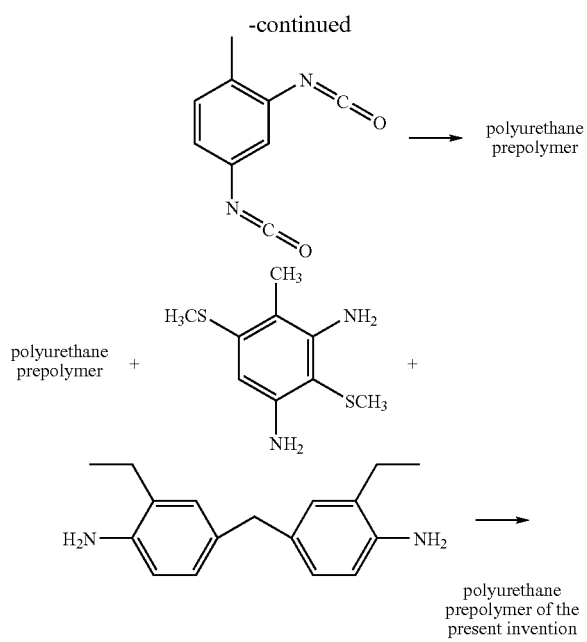

The polyurethane/polyurea polymers suitable for use in the invention are a product of a reaction between at least one polyurethane prepolymer with an optionally substituted 4,4'-methylenebisaniline and at least one slower curing agent. An embodiment of this invention contemplates the use of an optionally substituted 4,4'-methylenebisaniline with at least one slower curing agent in the reaction mixture with at least one polyurethane prepolymer. The preferred embodiment of this invention is to use the combination of an optionally substituted 4,4'-methylenebisaniline with a polyamine or a polyol as the curing agents.

A slow reacting curing agent with respect to an optionally substituted 4,4'-methylenebisaniline means that the nucleophilic groups on the slow reacting curing agent are sterically and/or electronically hindered because of the presence of electron withdrawing groups or interfering bulky groups situated adjacent to the reaction sites. A long chain flexible spacer of at least four carbons between reaction sites or three carbons with electron withdrawing groups also contributes to the slower reactivity of curing agents.

The rate of curing for a polyurethane, polyurea and polyurethane/polyurea hybrid mixture can be measured, for example, by a Vibrating Needle Curemeter (VNC) that is manufactured by Rapra Technology Limited. It is achieved by suspending a steel needle in the curing formulation. The needle is vibrated vertically by a small electrodynamic vibrator driven by a signal generator. Resistance to its movement is ultimately recorded as the voltage output.

Slow reacting polyamine curing agents such as 3,5-dimethylthio-2,4-toluenediamine and 3,5-dimethylthio-2,6-toluenediamine are isomers with two or more of the sites on the benzene ring substituted with groups that sterically hinder the reaction ability of the amine groups. Slow reacting polyamine curing agents such as trimethylene glycol-di-p-aminobenzoate and polytetramethyleneoxide-di-p-aminobenzoate have the two amine groups situated adjacent to two electron withdrawing carbonyl groups and are separated by flexible spacers, trimethylene, and polytetramethyleneoxide, respectively. Still another suitable group of polyamines comprises N,N'-dialkyldiamino diphenyl methane such as 4,4'-dibutyl diamine diphenyl methane wherein the aromatic amine group, is substituted by an alkyl group to become an aromatic secondary amine. The alkyl groups attached to the amine atoms, the flexible spacers between the amine groups, electron withdrawing groups and bulky groups substituted adjacent to the amine atoms all contribute to attenuate the reactivity of the amine, offering an increase in reaction time.

Preferably, the polyurethane polymers of the present invention comprise from about 1% to about 100% of the cover composition and/or the intermediate layer composition. In other preferred embodiments, the polyurethane polymers of the present invention comprise from about 10% to about 95% of the cover composition and/or the intermediate layer composition. In other preferred embodiments, the polyurethane polymers of the present invention comprise from about 25% to about 90% of the cover composition and/or the intermediate layer composition. In certain preferred embodiments, the intermediate layer composition comprises one or more other polymers and/or other materials as described below. Such other polymers include, but are not limited to polyurethane/polyurea ionomers, polyurethane/polyurea hybrids, polyurethanes, polyureas, epoxy resins and mixtures thereof. Unless otherwise stated herein, all percentages are given in percent by weight of the total composition of the golf ball layer in question.

Other suitable materials which may be combined with the polyurethane, polyurea and polyurethane/polyurea hybrid polymers in forming the cover and/or intermediate layer(s) of the golf balls of the invention include ionic or non-ionic polyurethanes or polyureas, siloxanes, epoxy resins and mixtures thereof. For example, the cover and/or intermediate layer may be formed from a blend of at least one polyurethane polymer with anionic and cationic urethanes/polyurethanes, urethane epoxies, polyureas and ionic polyureas and mixtures thereof. Examples of suitable urethane ionomers are disclosed in U.S. Pat. No. 5,692,974, the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358. These are all incorporated herein by reference.

Other conventional ingredients, e.g., density-controlling fillers, ceramics and glass spheres are well known to the person of ordinary skill in the art and may be included in cover and intermediate layer blends of the present invention in amounts effective to achieve their known purpose.

The present invention can be used in forming golf balls of any desired size. The USGA dictates that the size of a competition golf ball must be larger than 1.680 inches in diameter. Golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred, however diameters anywhere in the range of from 1.70 to about 1.95 inches can be used. Oversize golf balls with diameters above about 1.760 inches to as big as 2.75 inches are also within the scope of the present invention.

The coefficient of restitution (CoR) is the ratio of the relative velocity between two objects after direct impact to the relative velocity before impact. As a result, the CoR can vary from 0 to 1, with 1 being equivalent to a perfectly or completely elastic collision and 0 being equivalent to a perfectly plastic or completely inelastic collision. Since a ball's CoR directly influences the ball's initial velocity after club collision and travel distance, manufacturers are interested in this characteristic for designing and testing golf balls.

According to a technical report provided by the U.S. Golf Association, experiments have shown that the coefficient of restitution of impact between a golf ball and a club head is a smoothly declining (nearly linear) function of club head speed (Chou, P. C., Liang, D., Yang, J, Gobush, W. (1994), "Contact Forces, Coefficient of Restitution, and Spin Rate of Golf Ball Impact", *Science and Golf II*, E & FN Spon) (Cochoran, A. J. (1998), "Development and Use of One-Dimensional Models of a Golf Ball", *Science and Golf III*, Routledge) (Lemons, L. D. (1998), "Experiments in Golf Ball-Barrier Impacts", *Science and Golf III*, Routledge). This is understood to be a function of the hysteretic, rate-dependent nature of the polymeric materials used in golf ball construction (Tavares, G., Sullivan, M., and Nesbitt, D., (1998) "Use of Finite Element Analysis in Design of Multilayer Golf Balls," *Science and Golf III*, Human Kinetics) (Quintavalla, S. J. (2004), Finite Element Model of the Impact Behavior of a Golf Ball. USGA Test Center Report RB/mat2004-01) (Quintavalla, S. J. and Johnson, (2004) S. H., Extension of the Bergström-Boyce Model to High Strain Rates, Rubber Chem. and Tech., 77 (5)). After impact, the trajectory of the golf ball is governed by well-understood aerodynamic forces as well as gravity. Launch conditions for the test were obtained by striking balls using a servo-controlled mechanical golfer, equipped with a USGA conformance driver (Aeson, 9°), as per the USGA Overall Distance Standard. Experimental Determination of the Effects of Clubhead Speed on Driver Launch Conditions on the Effects of Drive Distance for Balls Used by the PGA Tour. USGA Technical Report RB/cor2006-01. Steven J. Quintavalla, Ph.D. USGA Research Engineer, Apr. 19, 2006.

One conventional technique for measuring CoR uses a golf ball or golf ball subassembly, air cannon, and a stationary vertical steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/sec to 180 ft/sec. As the ball travels toward the steel plate, it activates each light screen so that the time at each light screen is measured. This provides an incoming time period proportional to the ball's incoming velocity. The ball impacts the steel plate and rebounds through the light screens, which again measure the time period required to transit between the light screens. This provides an outgoing transit time period proportional to the ball's outgoing velocity. The coefficient of restitution can be calculated by the ratio of the outgoing transit time period to the incoming transit time period.

A CoR measuring method employed by the U.S.G.A. uses a golf ball or golf ball subassembly, a launching device, and a substantially fixed titanium disk. The titanium disk intending to simulate a golf club is circular, and has a diameter of about 4 inches, and has a mass of about 200 grams. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen so that the time period to transit between the light screens is measured.

This provides an incoming transit time period proportional to the ball's incoming velocity. The ball impacts the titanium disk, and rebounds through the light screens which measure the time period to transit between the light screens. This provides an outgoing transit time period proportional to the ball's out going velocity. The CoR can be calculated using the mass of the ball, the mass of the disk, outgoing time difference and incoming time difference.

EXAMPLES

The present invention is further defined in the following Examples, in which all parts and percentages are by weight and degrees are Celsius, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

Example 1

Two polyurethane/polyurea compositions were formulated as shown below in Tables 1 and 2. Both trials provided balls with an unexpectedly high initial velocity or coefficient of restitution.

TABLE 1

| Chemicals/Formulations | Weight (grams) | Equivalents | % of curing composition |
|---|---|---|---|
| Polyurethane Prepolymer (6.07% NCO) | 693.57 g | 1 eq. | Prepolymer to Curing Agent Ratio 4.79:1 |
| Curing Agents | | | |
| MBOEA | 60.33 g | 0.475 eq. | 41.69% |

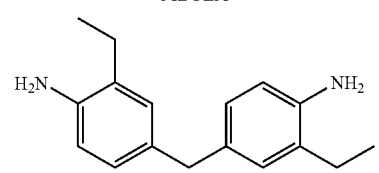

TABLE 1-continued

| Chemicals/Formulations | Weight (grams) | Equivalents | % of curing composition |
|---|---|---|---|
| DMTDA | 50.83 g | 0.475 eq. | 35.13% |

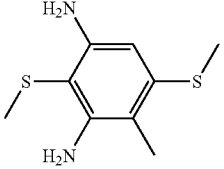

Ethacure 300

| | | | |
|---|---|---|---|
| White Dispersion Rebus 60201 | 25.15 g | | 17.38% |
| UV Absorber | 6.29 g | | 4.35% |
| Hindered amine light stabilizer (HALS) | 2.10 g | | 1.45% |

| Ball | Initial Velocity (ft/sec) |
|---|---|
| Foremost Urethane | 234.9 |
| Callaway HX Tour | 234.8 |
| Titleist Pro VI | 232.1 |
| Taylor Made TP/Black | 235.6 |
| Wilson Staff Tx4 | 234.6 |

The initial velocity of the golf balls is the initial velocity of the ball as measured after the ball is struck with a Driver club having a 9 degree launch angle and the club head having a velocity of about 160 ft/s. The coefficient of restitution is a measurement of perfect resilience. A perfectly unresilient composition would have a coefficient of restitution of 0. A perfectly resilient composition would have a coefficient of restitution of 1.

TABLE 2

| Chemicals/Formulations | Weight (grams) | Equivalents | % of curing composition |
|---|---|---|---|
| Prepolymer (6.07% NCO) | 693.57 g | 1 eq. | Prepolymer to Curing Agent Ratio 3.84:1 |
| Curing Agents | | | |
| MBOEA | 88.90 g | 0.70 eq. | 49.22% |

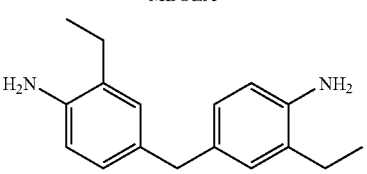

| Versalink P-250 | 56.75 g | 0.25 eq. | 31.42% |

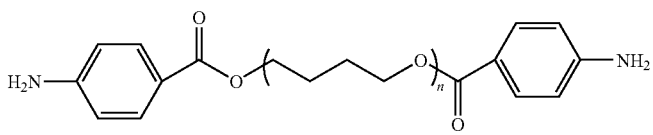

n = 3-4

| White Dispersion Rebus 60258 | 26.23 g | | 14.52% |
| UV Absorber | 6.56 g | | 3.63% |
| HALS | 2.19 g | | 1.21% |

| Ball | Coefficient of Restitution |
|---|---|
| Foremost Urethane | 0.753 |
| Wilson Staff Tx4 | 0.749 |

When ranges are used herein for physical properties, such as molecular weight, or chemical properties, such as chemical formulae, all combinations and subcombinations of ranges specific embodiments therein are intended to be included.

The disclosures of each patent, patent application and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A composition, comprising:
   a. a polyurethane prepolymer comprising the reaction product of:
      i. toluene diisocyanate; and
      ii. polytetramethylene ether glycol;
   b. 4,4'-methylenebis(2-ethylaniline); and
   c. at least one second curing agent selected from the group consisting of dimethylthio-2,4-toluenediamine; dimethylthio-2,6-toluenediamine; polycaprolactone triol; polytetramethyleneoxide-di-p-aminobenzoate; polyetheramine; dimer diol; and mixtures thereof;
      wherein said 4,4'-methylenebis(2-ethylaniline) is present at a level of about 40-80% equivalent weight, based on the total equivalent weight of said 4,4'-methylenebis(2-ethylaniline) and said second curing agent.

2. A layer, comprising the cured composition of claim 1.

3. A golf ball, comprising:
   a. a core; and
   b. at least one layer of claim 2.

4. The golf ball of claim 3, wherein said layer forms the outer cover of said golf ball.

5. A method of increasing the initial velocity of a golf ball, comprising the steps of:
   preparing the composition of claim 1;
   providing a core; and
   forming at least one cured layer on said core from said composition.

* * * * *